(12) United States Patent
Zimmerly et al.

(10) Patent No.: US 7,354,094 B2
(45) Date of Patent: Apr. 8, 2008

(54) METHOD AND APPARATUS FOR MAKING A CONVERTIBLE TOP

(75) Inventors: Craig M. Zimmerly, Maumee, OH (US); Donald J. Denewith, Onsted, MI (US); Kenneth David Edelman, Rochester, MI (US)

(73) Assignee: Magna Cartop Systems of America, Inc., Rochester Hills, MI (US)

( * ) Notice: Subject to any disclaimer, the term of this patent is extended or adjusted under 35 U.S.C. 154(b) by 358 days.

(21) Appl. No.: 10/982,536

(22) Filed: Nov. 5, 2004
(Under 37 CFR 1.47)

(65) Prior Publication Data
US 2005/0184563 A1    Aug. 25, 2005

Related U.S. Application Data

(60) Provisional application No. 60/517,503, filed on Nov. 5, 2003.

(51) Int. Cl.
*B60J 7/00*    (2006.01)
(52) U.S. Cl. .................................. 296/107.01
(58) Field of Classification Search ........... 296/100.18, 296/100.17, 100.15, 107.01, 225
See application file for complete search history.

(56) References Cited
U.S. PATENT DOCUMENTS

| | | | |
|---|---|---|---|
| 788,608 A | 5/1905 | Shipman | |
| 2,855,663 A | 10/1958 | Weber et al. | |
| 3,391,635 A | 7/1968 | Matheus | |
| 3,878,010 A * | 4/1975 | Zammit | 156/71 |
| 4,029,532 A | 6/1977 | Warhol et al. | |
| 4,239,279 A * | 12/1980 | Gonas et al. | 296/210 |
| 4,490,205 A * | 12/1984 | Warhol | 156/351 |
| 4,840,419 A | 6/1989 | Kolb | |
| 5,552,006 A | 9/1996 | Soliday et al. | |
| 5,680,262 A | 10/1997 | Soliday et al. | |
| 5,768,761 A | 6/1998 | Zeiler et al. | |
| 5,918,928 A | 7/1999 | Kolb et al. | |
| 6,295,713 B1 | 10/2001 | Hilliard et al. | |
| 6,325,446 B1 | 12/2001 | Wuellrich et al. | |
| 6,470,559 B1 | 10/2002 | Spaulding et al. | |

\* cited by examiner

*Primary Examiner*—H Gutman
(74) *Attorney, Agent, or Firm*—Brinks Hofer Gilson & Lione

(57) ABSTRACT

Many vehicles use convertible tops that raise and lower. Most often these vehicles use "soft" convertible tops. Unfortunately, it is often very difficult to achieve uniform tensioning of the cover material as it is attached to the rear bow, or to achieve uniform tensioning from top to top. The disclosed apparatus and method of making a convertible top comprises maintaining a portion of the frame member in a substantially fixed position, grasping the cover with a plurality of clamping members, pulling the cover over the portion of the frame member, applying a predetermined amount of force to the cover as it is pulled over the portion of the frame member, and fixing the cover to the portion of the frame member thereby creating a predetermined tension to the convertible top.

19 Claims, 3 Drawing Sheets

METHOD AND APPARATUS FOR MAKING A CONVERTIBLE TOP

CROSS-REFERENCE TO RELATED APPLICATIONS

This application claims priority from U.S. Provisional Patent Application No. 60/517,503 filed on Nov. 5, 2003, which is hereby incorporated by reference.

FIELD OF INVENTION

The present invention relates generally to making convertible tops, and more particularly, to a method and apparatus for accurately making a convertible top that is tensioned a predetermined amount.

BACKGROUND

A so-called "soft" convertible top comprises a pair of spaced longitudinal articulated frames connected by transverse frame members or bows, which support a fabric material top. The front bow is the header, which is clamped to a vehicle windshield header to close a convertible vehicle passenger compartment. The top fabric cover is attached to and extends rearwardly from the header rearward over the transverse bows to attachment to the rear bow.

The convertible top cover must be tensioned in the top raised position to give the top proper shape and form to it when installed on the vehicle. Otherwise, the convertible top will not fit correctly on the vehicle or it will not look aesthetically pleasing.

Conventionally, the rear hem of the top cover is attached at a plurality of spaced points, e.g., 20, to the rear bow. When attaching the rear hem, the material is manually tensioned prior to attachment. This tensioning is an art rather than a science, and an inexperienced top installer can provide too much or too little tension. This can result in the top being unevenly tensioned across the rear bow, thus producing wrinkles when installed on the vehicle. If the material is insufficiently tensioned, the material will sag between the bows as the material stretches during use. If the material is tightly tensioned, stretching to attach the header will be difficult if not impossible for the power or manual top operator. As a result of this manual process, it is difficult to achieve uniform tensioning of the material as it is attached to the rear bow, or to achieve uniform tensioning from top to top.

Thus, it would be desirable to provide an apparatus and a method of making a convertible top that during attachment of the cover to the rear bow uniform tensioning of the material as it is attached to the rear bow is achieved. Additionally, it would be desirable to provide an apparatus and method of making a convertible top that achieves uniform tensioning from top to top.

SUMMARY OF THE INVENTION

It is an object of this invention to provide a method of making a convertible top that comprises at least one frame member and a cover. The method comprises maintaining a portion of the frame member in a substantially fixed position, grasping the cover with a plurality of clamping members, pulling the cover over the portion of the frame member, applying a predetermined amount of force to the cover as it is pulled over the portion of the frame member, and fixing the cover to the portion of the frame member thereby creating a predetermined tension in the convertible top.

It is a further object of the present invention to provide a method of making a convertible top having at least one frame member and a cover. The method comprises maintaining a portion of the frame member in a substantially fixed position, grasping the cover with a plurality of pneumatic clamping members, pulling the cover over the portion of the frame member using the pneumatic clamping members, applying a predetermined amount of force to the cover as it is pulled over the portion of the frame member, wherein the force applied correlates to an amount of air pressure applied to the pneumatic clamping members, and fixing the cover to the portion of the frame member thereby creating a predetermined tension in the convertible top.

Finally, it is an object of the present invention to provide an apparatus for making a convertible top, the convertible top comprising at least one frame member and a cover. The apparatus comprises a support member adapted to support and hold a portion of the frame member in a substantially fixed position, a plurality of clamping members that grasp and pull the cover over the portion of the frame member, and a control mechanism operably coupled with the clamping members that regulates the clamping members to apply a predetermined amount of force to the cover as it is pulled over the portion of the frame member.

DESCRIPTION OF THE DRAWINGS

Objects and advantages together with the operation of the invention may be better understood by reference to the following detailed description taken in connection with the following illustrations, wherein.

DETAILED DESCRIPTION OF THE INVENTION

Figure 1:
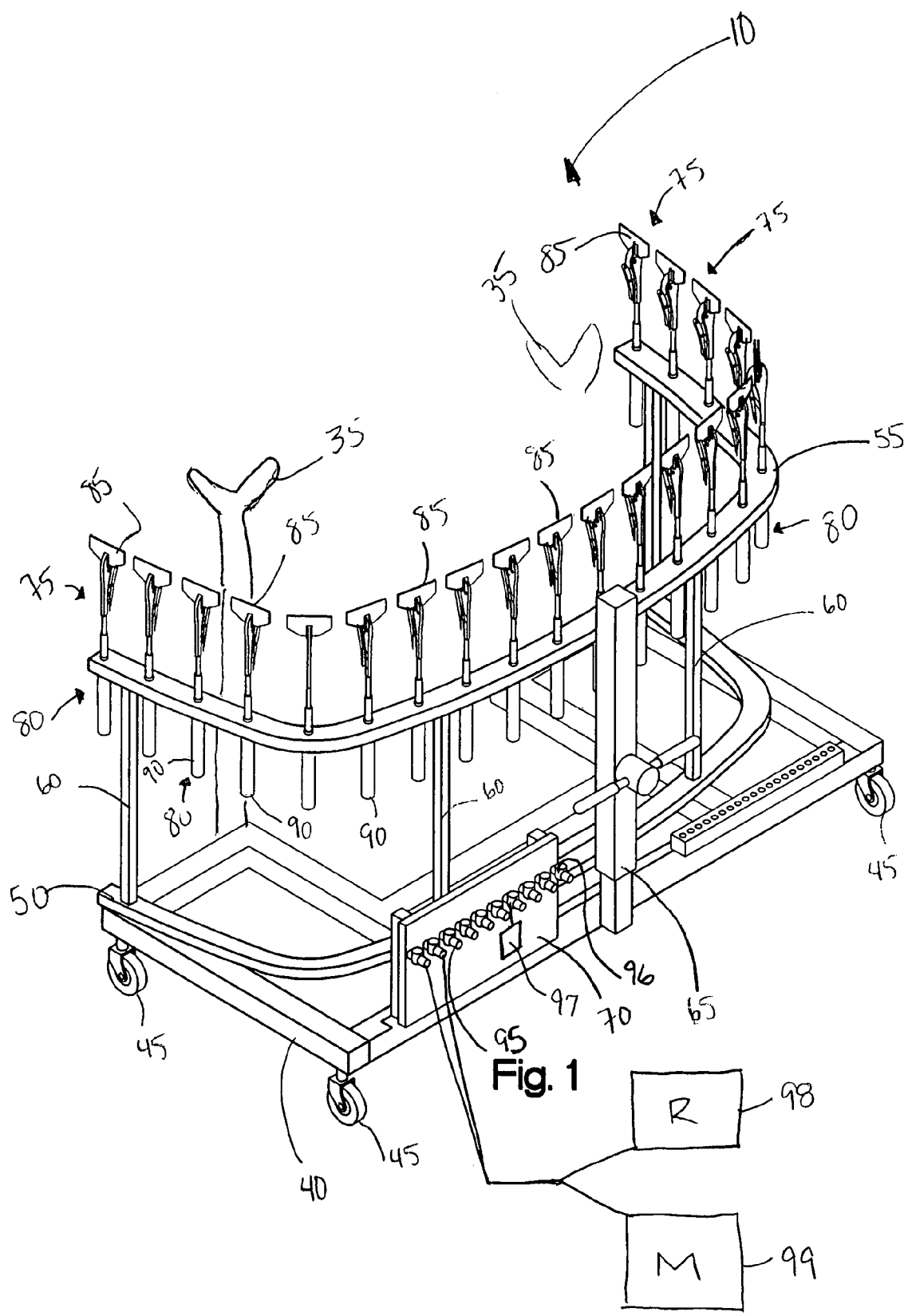
FIG. 1 is a perspective view of one embodiment of an apparatus for making a convertible top according to the present invention.
Figure 2:
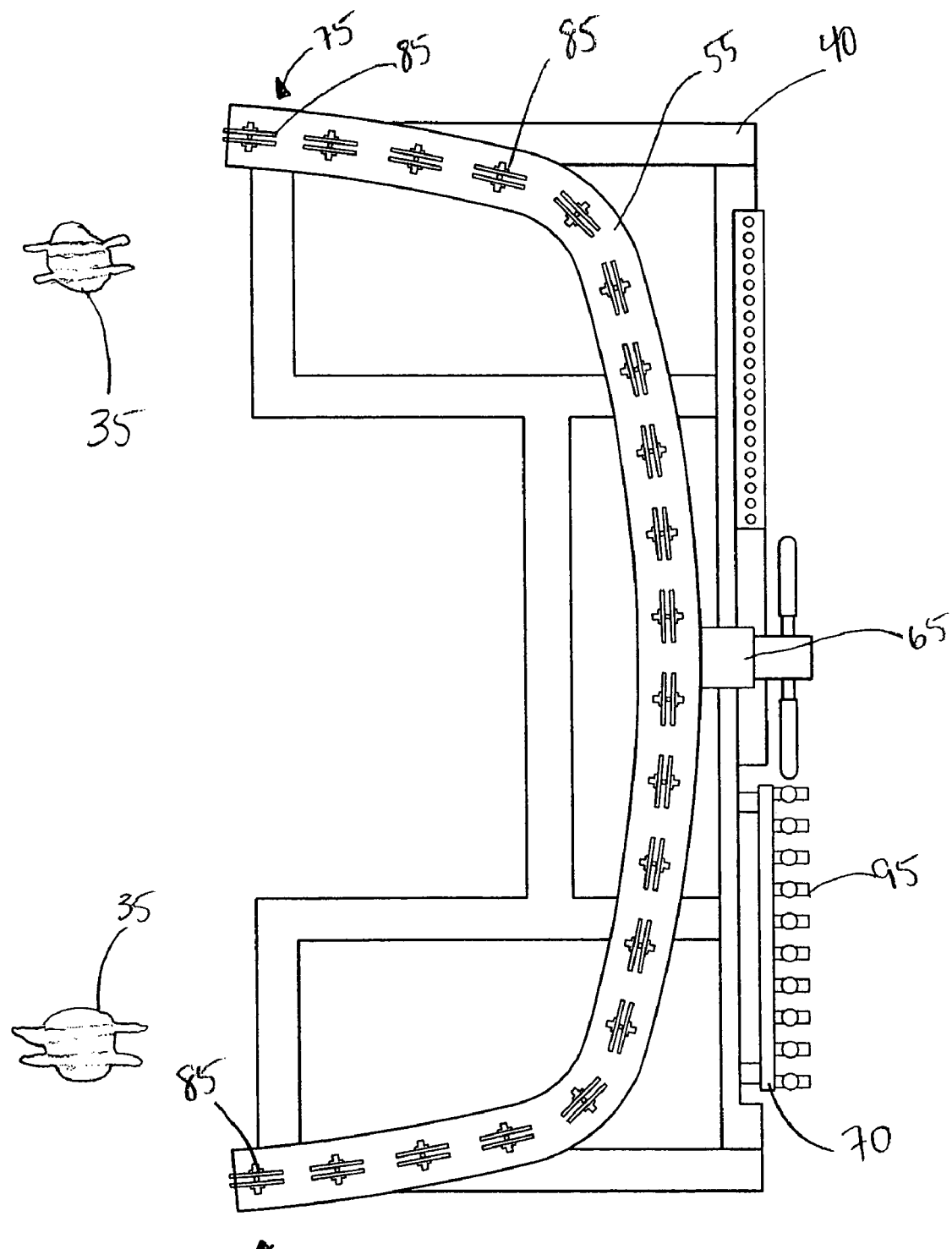
FIG. 2 is a top view of the apparatus for making a convertible top of FIG. 1.
Figure 3:
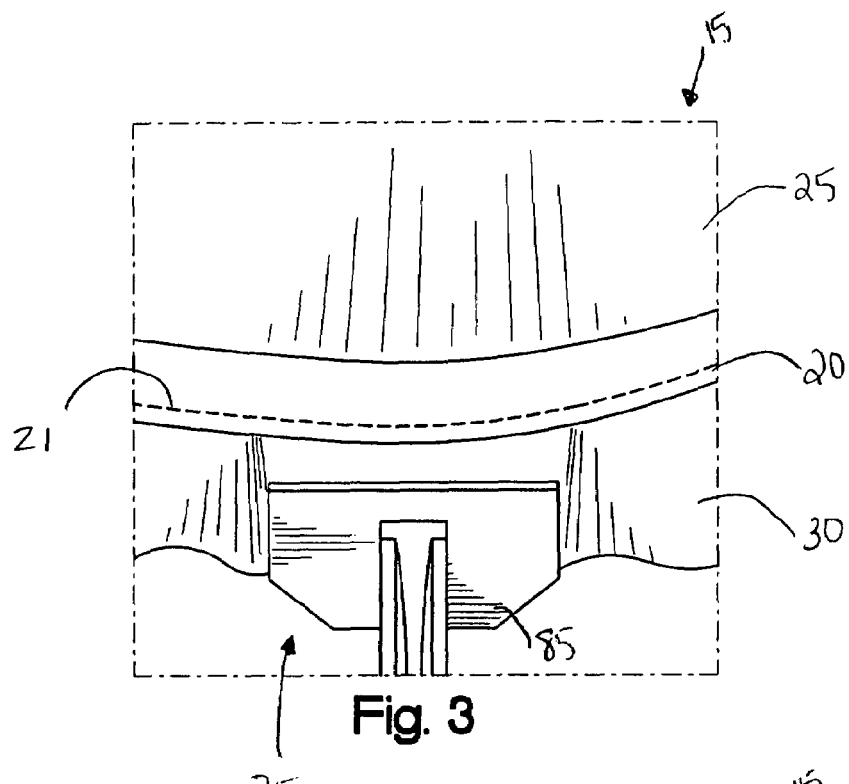
FIG. 3 is a detail view of a clamping member of the present invention grasping a portion of a top cover of the convertible top.
Figure 4:
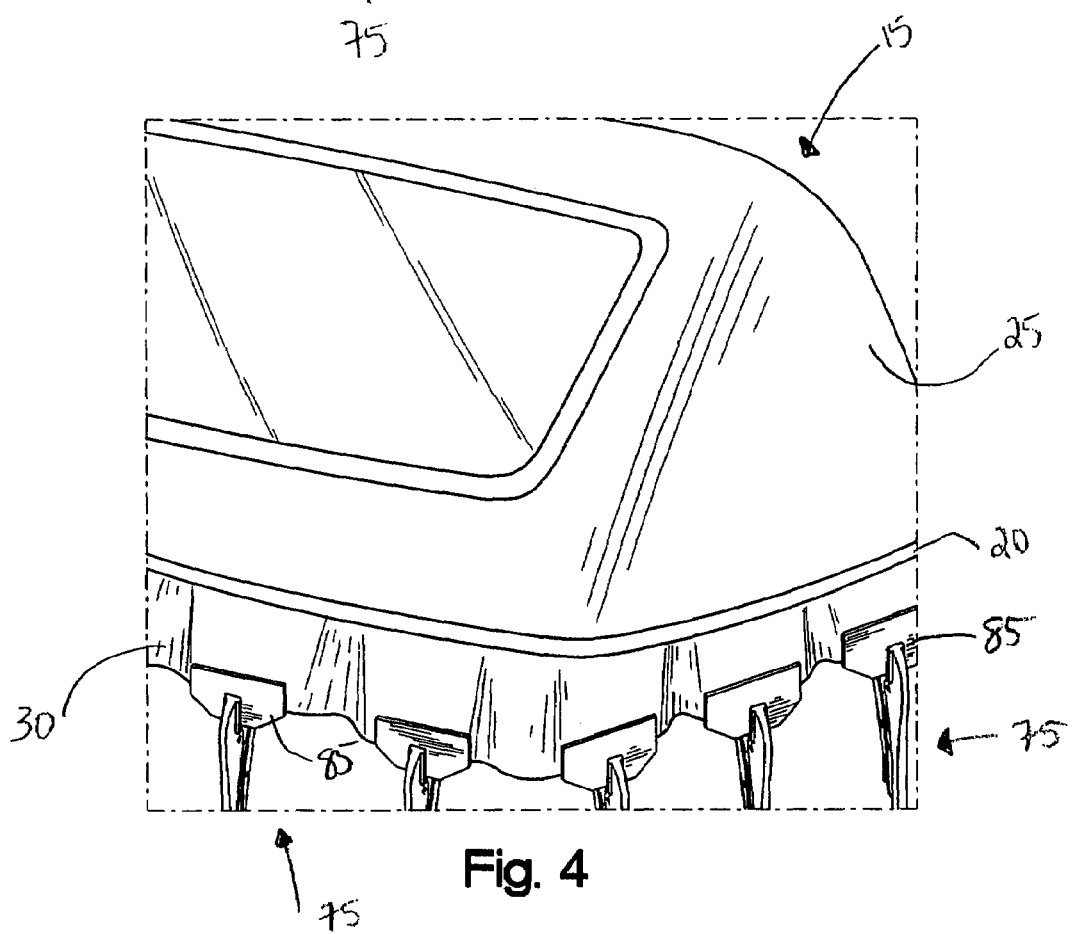
FIG. 4 is a side view of a plurality of the clamping members of the present invention grasping a portion of the top cover of the convertible top.

Referring now to FIGS. 1 through 4, an apparatus 10 for making a convertible top 15 is shown. As shown in FIGS. 3 and 4, the convertible top 15 comprises a plurality of frame members including a pair of spaced longitudinal articulated frame members (not shown) connected by transverse frame members including a portion of one of the frame members 20 that has at a portion of a top cover 25 fixed to it. The cover includes a hem 30 located at an end of the cover 25. The hem 30 is fixed to the portion of the frame member 20, or bow, to create a portion of the convertible top 15, as described in more detail below.

The apparatus 10 includes a support member 35, such as a fixture or a jig, adapted to support and hold at least a portion of at least one of the frame members 20, such as the bow, in a substantially fixed position. The apparatus 10 further includes a base 40 mounted on four caster wheels 45. Or, alternatively, the base 40 of the apparatus 10 may be fixed to the ground or a portion of a workstation (not shown). Mounted on the base 40 is a lower U-shaped frame 50 that in turn supports an upper U-shaped bracket 55 via spaced uprights 60. An upright 65 extends upwardly from the rear of base 40 and has mounted thereto a mounting board 70.

The apparatus 10 further includes a plurality of clamping members 75 that grasp and pull the cover 25 over a portion of at least one frame member 20, as described below. In particular, the clamping members 75 are mounted on bracket 55. It should be understood that, despite twenty clamping members 75 being shown, just about any number of clamping members 75 may be used with the present invention.

The clamping members 75 comprise actuators 80 with a pair of pivoted jaws 85 operably connected therewith. The actuators 80 may be pneumatic actuators, hydraulic actuators, manual actuators, or any other sort of actuator. The preferred embodiment, however, uses pneumatic actuators that comprise depending air cylinders 90. The air cylinders 90 are each connected by air hoses (not shown) to some sort of control mechanism 95. The control mechanism 95 may include an air regulator 96 or even an electronic load cell 97 mounted on the board 70 to a conventional air pressure source (not shown). The control mechanism 95, including air regulators, may in turn be controlled by a remote controller 98 to supply air, fluid, etc. to cylinders 90. Alternatively, the control mechanism 95 may include some sort of fluid regulator, including a pump (not shown) that regulates fluid flow to the hydraulic actuator.

The pivoted jaws 85 of the clamping members 75 are selectively closed to grasp a portion of the top cover 25, such as the hem 30, that depends below the portion of the frame member 20 or bow, as further described below. The pivoted jaws 85 may be manually operated, i.e., closed and locked in a grasping position by an operator using the pump or other manual controller 99. Or, alternatively, the pivot jaws 85 may be automatically operated using the control mechanism 95. For example, the pivot jaws 85 may be pneumatic, and as such, the control mechanism 95 can regulate the airflow to the pivot jaws 85 to open and close them to grasp or ungrasp the cover 25. In addition, the pivot jaws 85 may be hydraulically operated so that the control mechanism 95 can provide or withdraw fluid flow to open and close the pivot jaws 85.

Operation of the apparatus 10 will now be described. The apparatus 10 can either be positioned as one station in a convertible top assembly line, or it can be part of a permanent station in a fixed convertible top assembly line. A fully opened convertible top 15 is positioned over, and dropped onto apparatus 10, including support member 35 by means not shown. In this position, a portion of the frame 20 of the convertible top 15 is maintained in a substantially fixed position. In particular, the convertible top 15 is held and supported by the support member 35. Next, spaced portions of the cover 25, or, in particular, the hem 30, are positioned over and inserted into the open pivot jaws 85 of the clamping members 75. The pivot jaws 85 of the clamping members 75 are closed. The pivot jaws 85 may be closed by air pressure, hydraulic pressure, or even manually. Upon the closing of the pivot jaws 85, they grasp a portion of top cover 25, such as the hem 30. Upon grasping, the actuators 80 then retract to pull the hem 30 over the portion of the frame member 20, as shown in FIGS. 3 and 4. A predetermined amount of force is applied to the cover 25 as it is pulled over the portion of the frame member 20. The amount of force applied, i.e., the distance the actuator 80 retracts, is controlled and regulated by the control mechanism 95. For example, if the actuator 80 is a pneumatic actuator, the air regulator will control the amount of air going to and being released from the actuator 80 to control the amount of force applied to the cover 25 as it is being pulled. On the other hand, if the actuator is hydraulic, the fluid flow regulator will control the amount of fluid going to and being released from the actuator 80 to control the amount of force applied to the cover 25 as it is being pulled.

After the predetermined force levels have been attained, the hem 30 material is fixed to a portion of the frame member 20. For example, it may be stapled with staples 21 (FIG. 3) or otherwise conventionally secured to the bow. This creates a predetermined tension on the convertible top 15 that gives the convertible top 15 proper shape and form. It reduces and can even eliminate the wrinkles from the convertible top 15 and the tension is repeatable from top to top. The tension on the convertible top 15 correlates to the force applied to the cover 25 as it is pulled over the portion of the frame member 20. Thereafter, the pivot jaws 85 are opened and the top 15 is then lifted off apparatus 10 and moved to a further processing station.

The invention has been described above and, obviously, modifications and alternations will occur to others upon a reading and understanding of this specification. In addition, the method of assembly described above is not limited to the order in which the steps above are recited. The claims as follows are intended to include all modifications and alterations insofar as they come within the scope of the claims or the equivalent thereof.

Having thus described the invention, we claim:

1. An apparatus for making a convertible top, the convertible top comprising at least one frame member and a cover, a position of the frame member being supported in a substantially fixed position, the apparatus comprising:
   a plurality of clamping members configured to grasp and pull the cover over a portion of the frame member; and
   a control mechanism operably coupled with the clamping members configured to regulate the clamping members to apply a predetermined amount of displacement or force to the cover as it is pulled over the portion of the frame member.

2. The apparatus of claim 1, further comprising a means for fixing the cover to the portion of the frame member thereby creating a predetermined tension in the convertible top.

3. The apparatus of claim 2, wherein the means for fixing the cover comprises staples.

4. The apparatus of claim 1, wherein each of the clamping members comprises a pair of pivoted jaws connected with an actuator.

5. The apparatus of claim 4, wherein the control mechanism comprises at least one of an air pressure regulator and an electronic load cell.

6. The apparatus of claim 4, wherein the actuators are configured to contract to pull the cover over the portion of the frame member.

7. The apparatus of claim 6, wherein the actuators are configured to vertically adjust the position of the plurality of clamping members.

8. The apparatus of claim 6, wherein the actuators are operable in two modes, including a first mode opening and closing the plurality of clamping members to grasp the cover, and a second mode translating the plurality of clamping members to pull the cover over the portion of the frame member.

9. The apparatus of claim 4, wherein the actuators are hydraulic actuators.

10. The apparatus of claim 1, the plurality of clamping members aligned in a row extending laterally and longitudinally.

11. The apparatus of claim 10, the row having a generally U-shape.

12. The apparatus of claim 4, wherein the actuators are pneumatic actuators.

13. The apparatus of claim 1, the cover further comprising a hem, the apparatus being configured to pull the hem over the portion of the frame member, the hem being configured to be fixed to the frame member.

14. The apparatus of claim 13, the portion of the frame member comprising a bow, wherein the apparatus is configured to pull the hem over the bow, the hem being configured to be fixed to the bow.

15. The apparatus of claim 1, further comprising a support member supporting the frame member in the substantially fixed position.

16. The apparatus of claim 15, wherein the support member forms a portion of the apparatus.

17. The apparatus of claim 1, further comprising a base portion and a plurality of wheels coupled to the base portion.

18. The apparatus of claim 1, further comprising a remote controller being operably connected to the control mechanism to control movement of the clamping members.

19. The apparatus of claim 1, further comprising a manual controller operably connected to the control mechanism, the manual controller configured to be operated manually to close and lock the clamping members in a grasping position.

* * * * *